United States Patent
Saulsbury

(10) Patent No.: US 6,732,143 B1
(45) Date of Patent: May 4, 2004

(54) METHOD AND SYSTEM FOR INTEGRATING TELEPHONE VOICE COMMUNICATIONS INTO A CLIENT-SERVER ARCHITECTURE

(75) Inventor: Ashley N. Saulsbury, Los Altos, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 542 days.

(21) Appl. No.: 09/637,457

(22) Filed: Aug. 11, 2000

(51) Int. Cl.[7] .............................. G06F 15/16
(52) U.S. Cl. ................. 709/203; 709/217; 709/227
(58) Field of Search .................. 709/203, 227, 709/238, 239, 217; 370/211, 212

(56) References Cited

U.S. PATENT DOCUMENTS

| | | | |
|---|---|---|---|
| 6,104,922 A | | 8/2000 | Baumann .................... 455/410 |
| 6,263,064 B1 | * | 7/2001 | O'Neal et al. ......... 379/201.03 |
| 6,295,551 B1 | * | 9/2001 | Roberts et al. ............ 709/205 |
| 6,434,528 B1 | * | 8/2002 | Sanders ...................... 704/275 |
| 6,446,127 B1 | * | 9/2002 | Schuster et al. ............ 709/227 |
| 6,463,145 B1 | * | 10/2002 | O'Neal et al. ......... 379/211.02 |
| 6,526,041 B1 | * | 2/2003 | Shaffer et al. .............. 370/352 |

FOREIGN PATENT DOCUMENTS

| | | | | |
|---|---|---|---|---|
| EP | 0 935 380 | 8/1999 | ............ | H04M/7/00 |
| GB | 2 328 117 | 2/1999 | ......... | H04M/15/00 |
| WO | WO 99/56495 | 11/1999 | ............ | H04Q/7/38 |

* cited by examiner

*Primary Examiner*—Zarni Maung
(74) *Attorney, Agent, or Firm*—Foley Hoag LLP

(57) ABSTRACT

A method and apparatus for routing a telephone signal having a call destination indicator via a client-server network to a desired user, wherein a server contains an association between user identifiers and telephone destination identifiers, and the server associates each user having a user identifier with a client machine having a client identifier that is employed by the user. The server directs the telephone signal over the client-server network to a telephone appliance coupled to a client machine having a client indicator associated with the user call destination identifier that matches the call destination identifier of the telephone signal.

27 Claims, 4 Drawing Sheets

| User Identifier | User Call Destination Identifier | Client Identifier |
|---|---|---|
| Joe B. Smith | 999-555-1001 | 106a |
| Bob B. Jones | 999-555-1002 | 106b |
| Sam R. O'Neill | 999-555-1003 | 106b |
| Sue A. Smith | 999-555-1004 | |
| ⋮ | | |
| | | |

402 — User Identifier
404 — User Call Destination Identifier
406 — Client Identifier

*Fig. 4*

METHOD AND SYSTEM FOR INTEGRATING TELEPHONE VOICE COMMUNICATIONS INTO A CLIENT-SERVER ARCHITECTURE

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates to client-server networks and more particularly a method and system for directing an incoming telephone call to a desired user over a client-server network.

A client-server network architecture is a network in which one computer, the client, requests access to data, software, or services from another computer, the server, which then supplies the requested data, software, or services for the client. In one type of client-server network known as a file server network, a user at a client machine is connected to the server via a local area network (LAN) and accesses data that is centrally located on the server. In general, the user retrieves the centrally located data from the server and locally processes this data using software applications that are stored and executed on the client machine. This type of client, typically referred to as a "fat client", performs most or all of the processing locally, leaving little or no processing to be performed by the server.

Client-server networks have several advantages over individual personal computers (PCs). One advantage is that by providing centrally stored data, a client server network ensures that the most recent data is always available to the users. Individual clients may operate on the data, but after processing, the data will again be centrally stored on the server. Also, as new data becomes available it becomes available to all of the clients. In addition to allowing multiple clients access to the centrally located data, a user may access this data at a remote client machine. Provided that the needed software is installed on the remote client machine, a user may log onto the server, retrieve data, and then process that data from the remote location thus enhancing productivity. Also, a user may be able to dial into the LAN via a remote client and access the server remotely, for example from their home. This would allow the user to download the desired data, process this data at home and, when finished, save the data back onto the server.

A disadvantage to the client-server network architecture, however, is that when a user is operating a client machine other than their primary client machine, the user will not have access to their computer "desktop", and any local data stored on their "own" or primary machine. For example, a user may use a particular set of macros when using a word processor, spreadsheet, or presentation program. These macros typically are stored locally and would be a part of the user's desktop. Other examples of items available on a users personal desktop may include particular programming tools or productivity tools the user has developed or purchased. Thus, although a user may have access to the centrally located data, the lack of availability of their personalized desktop and software tools may limit their ability to work efficiently.

Another disadvantage of client-server network architectures is that a user operating at a client machine other than the user's primary client machine may not have access to incoming telephone calls directed to them. Although a LAN may provide easy user access to centrally located data from different clients, the standard telephone system does not provide a mechanism by which the user's calls automatically follow the user. The traditional telephone system paradigm that is embodied in the public switched telephone system (PSTN) and private branch exchanges (PBX) is that a user's phone number is coupled to a single physical telephone located physically proximate to the user's principle work area. Unless the user manually forwards their telephone calls to a specified remote location, incoming calls will be directed to the single telephone associated with the user.

Recently, another form of the client-server network architecture, known as a "thin-client" network has been developed that addresses some of the problems of a traditional client-server network. In this architecture, a client machine referred to as a thin-client machine is employed. The thin client performs minimal processing, and stores little or no data. The thin client is employed to provide a graphical user interface and to display data and information generated by the server. The thin client includes an interface for communicably coupling the thin client to the server. The server provides the processing power and data storage that is required by the respective thin client. A user may log onto any thin client machine connected to the server and the server, which may store the applications software and the user's data and desktop, provides the user with their customary operating environment associated with that user. The server performs all the data processing and data storage functions. The thin client provides only the user interfaces to display graphics, text, and data, and to receive user input data. The ability of a user to log onto any one of a plurality of thin clients and obtain access to his usual desktop and computational configuration is known in the art as "hot desking".

A thin-client network architecture offers several advantages over traditional client-server network architectures. One advantage of the thin client network is that a user can access their desktop features including their personal software, data, and tools from the server from any thin-client machine in the network. Flexibility is therefore afforded since multiple users may utilize a single thin-client machine at different times during the day depending on individual schedules, work hours and needs. In addition, a user may select a different thin client machine to use each day, depending on the availability of the machines. This flexibility may result in better asset management, a higher availability of machines, and a concomitant increase in productivity and efficiency of the users.

However as discussed above, a user of a remote client machine may not have access to the user's incoming telephone calls directed to a single telephone. A thin-client network architecture may exacerbate this problem even more because of the use of a thin-client network architecture, it is likely that users may not be physically proximate to their telephone. Thus, it is likely that increasing numbers of telephone calls may be missed.

Various methods such as voice mail, electronic messaging and call forwarding have been attempted to overcome this lack of telephone connectivity, but all have had substantial disadvantages.

It would therefore be desirable to be able to connect telephone signals to a particular user at a telephone communicably coupled to a client station being employed by the respective user so that telephone calls track the user in a hot-desking environment.

BRIEF SUMMARY OF THE INVENTION

Consistent with the present invention, a method and system is disclosed for directing a telephone signal intended for a user of a client-server network to a telephone appliance communicably coupled to the client being employed by that user and for creating a telephone connection between the telephone appliance and a calling party. The user is identified to the client via a logon process, a smartcard, biometric identification, or any other suitable user identification technique. The client forwards a user identifier associated with the user to a server within the client-server network. A telephone number or other such user call destination identifier is associated with each user and the server maintains a mapping table that stores the user identifier for the respective user along with the associated user call destination identifier for that user. In response to receipt of the user identifier from a particular client, the server associates a client identifier associated with that client with the entry in the table that includes the corresponding user identifier. In response to receipt at the server of a telephone signal initiated by a calling party and having a specified call destination identifier from a calling party, the server directs the telephone signal to the client associated with the matching user call destination identifier in the mapping table and establishes a connection to permit voice communication between the user at a telephone appliance coupled to the respective client and the calling party.

Other forms, features and aspects of the above-described methods and system are described in the detailed description that follows.

BRIEF DESCRIPTION OF THE SEVERAL VIEWS OF THE DRAWING

The invention will be more fully understood by reference to the following Detailed Description of the Invention in conjunction with the drawings of which:

FIG. 4 illustrates a mapping table for use in the server depicted in FIG. 1.

DETAILED DESCRIPTION OF THE INVENTION

Figure 1:
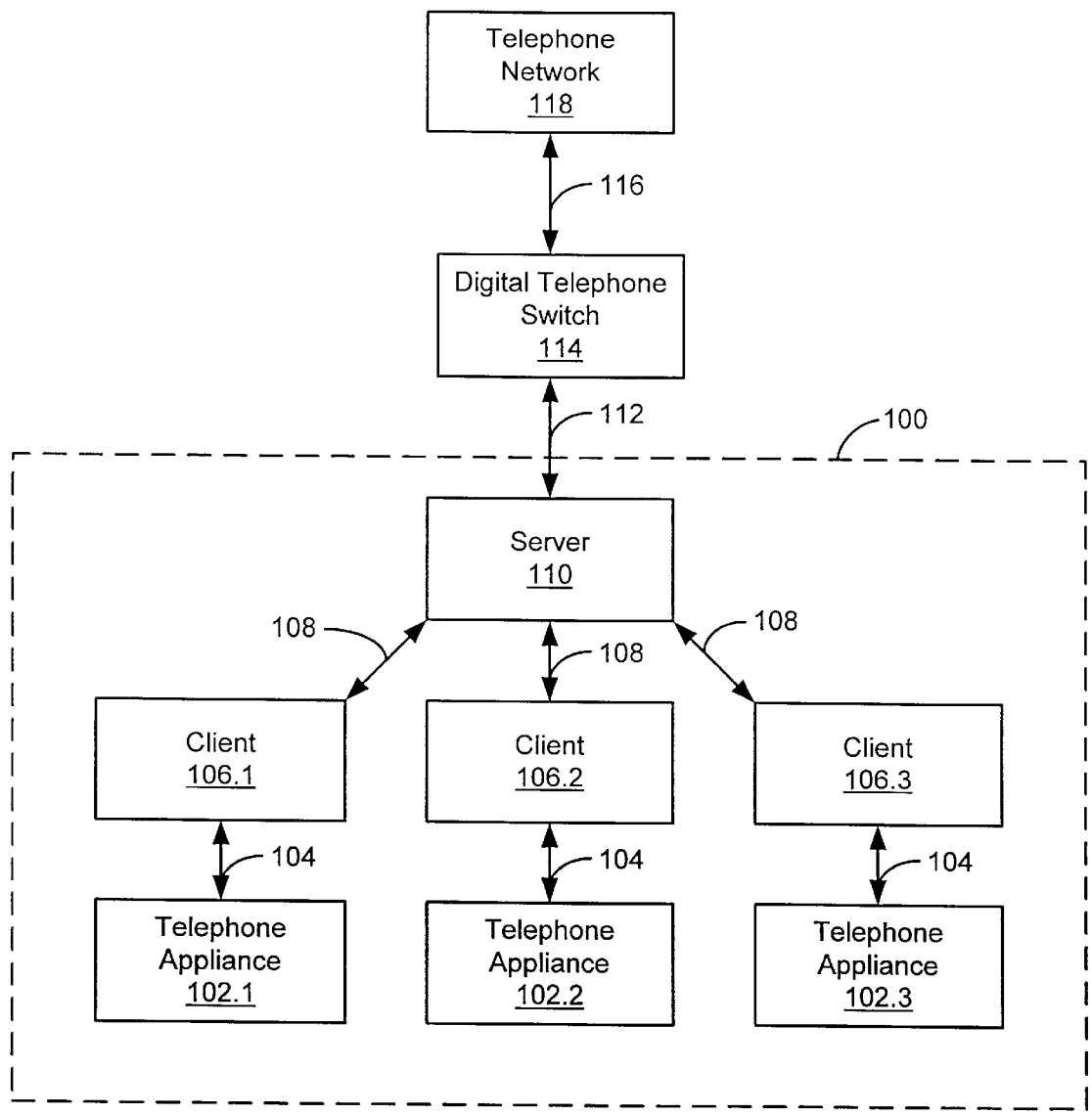
FIG. 1 is a block diagram of a client-server network telephone call routing system operative in a manner consistent with the present invention.

A method and system consistent with the present invention for establishing a telephone connection between a calling party and a called party in a client-server network is disclosed. Referring to FIG. 1, an exemplary client-server network is depicted. The client-server system 100 includes server 110 coupled to clients 106 via connections 108. For simplicity three clients designated as clients 106.1, 106.2 and 106.3 respectively, are illustrated although it should be recognized that any number of clients may be employed subject to server and network bandwidth limitations. Clients 106 have telephone appliances 102 and designated as telephone appliances 102.1, 102.2 and 102.3 respectively communicably coupled to the respective clients 106 via connections 104. A digital telephone switch 114 receives incoming telephone calls from a telephone network 118 via connection(s) 116 and provides digitized representations of the telephone signals to the server 110 via connection 112. The digitized representation of the telephone signal includes a call destination identifier in the form of the telephone number of the called party or any other suitable identifier associated with the called party. Information provided to the server 110 by a client 106, as described below, allows the server 110 to direct the received digital telephone signals to the telephone appliance 102 associated with the proper client 106 and to establish a voice connection between the calling party and the called party via the telephone appliance coupled to the respective client. In a preferred embodiment, the digitized representations of the telephone signals are communicated from the server 110 to the respective telephone appliance 102 and from the telephone appliance 102 and the server 110 via a voice over IP protocol, or other suitable voice over network protocal.

In a preferred embodiment, the clients 106 comprise thin-clients and the telephone appliances 102 are communicably coupled to the thin clients. With reference to FIG. 1, a user (not shown) establishes a connection between the thin-client 106 and the server 110. During the process of establishing the connection, a client identifier that serves to uniquely identify the respective client 106 is conveyed to the server 110.

A user identifier is generated by the client 106 in response to a logon event initiated by the user or as a consequence of the insertion of a smart card in a smart card reader coupled to the respective client, biometric authentication of the user, or any other suitable technique for identifying the user. It should be noted that the user identifier may be generated in response to the user of one of more of the above described techniques. For example, the user identifier may be generated by the client in response to the entry by the user of a user name and an appropriate password.

Figure 2:
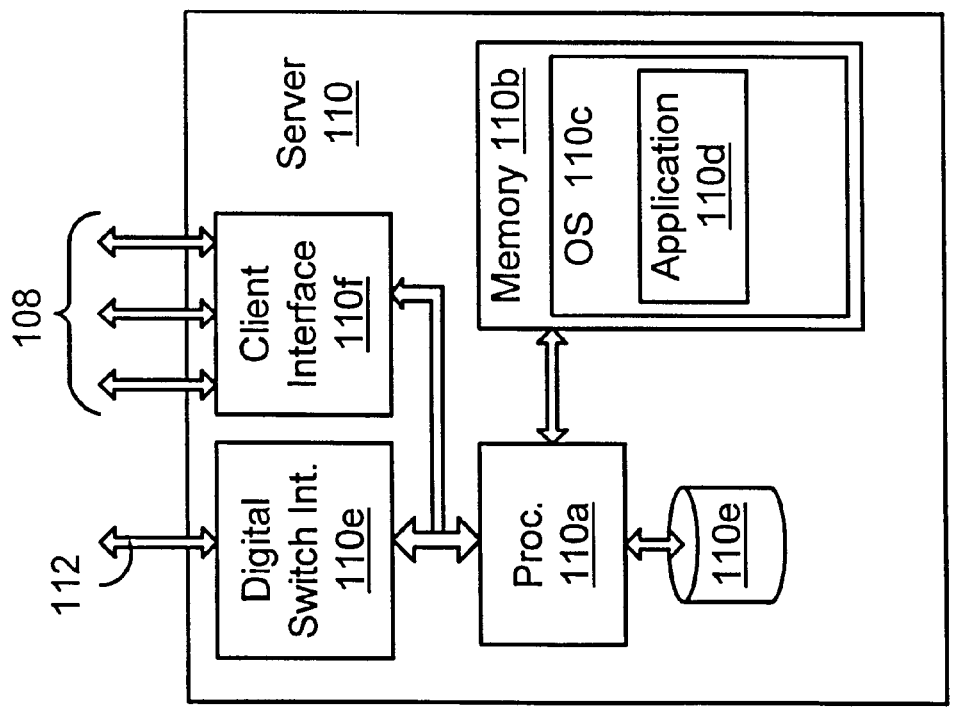
FIG. 2 is a block diagram of the server of FIG. 1.

Referring to FIG. 2 the server 110 includes a digital telephone switch interface 110e for coupling the server 110 to the digital telephone switch 114. Additionally, the server 110 includes a client interface 110f for communicably coupling the server to the clients 106. The client interface may comprise an interface to a network for communicating with the clients 106, or a concentrator for combining a plurality of data streams into one shared channel, or a switch which permits communications between the server 110 and the clients 106.

Figure 5:
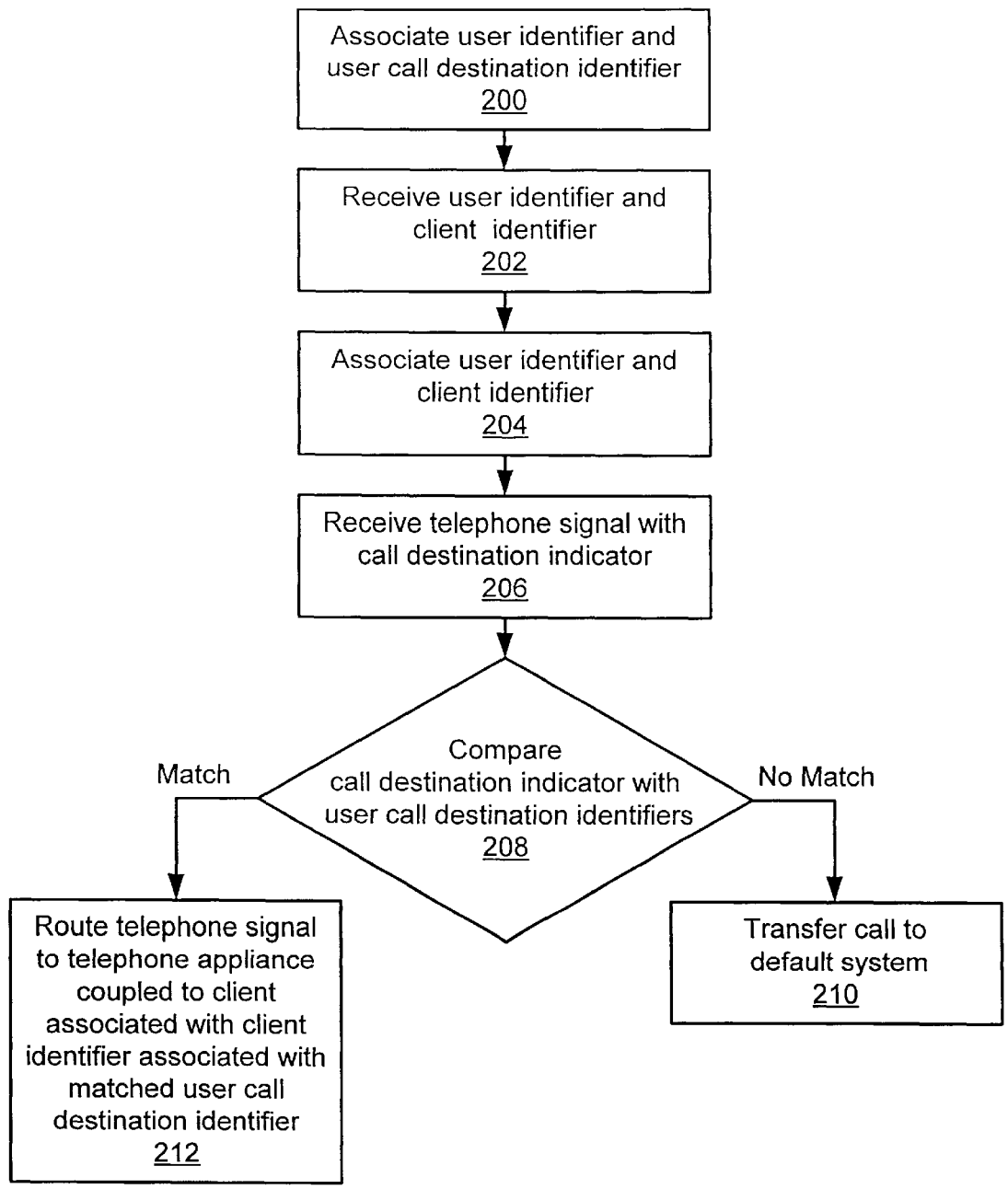
FIG. 5 is a flow diagram illustrating an exemplary method of operation for directing a received telephone signal to a desired user over a client-server network.

Additionally, the server 110 includes a processor 110a which is operative to execute a program stored in a memory 110b, such as a ROM or RAM. Typically, the memory 110b includes an operating system 110c. The memory further includes an application program 110d operative to perform the methods described herein and depicted in FIG. 5. Though the memory 110b within the server is illustrated as a single memory for simplicity, it should be appreciated that the memory 110b may include memory portions of different types. For example, the memory 110b may include a ROM, which maintains an executable code image, and a RAM for temporary data storage. Alternatively, the code image may be executed out of a RAM. The server 110 typically includes secondary data storage 110g.

Figure 3:
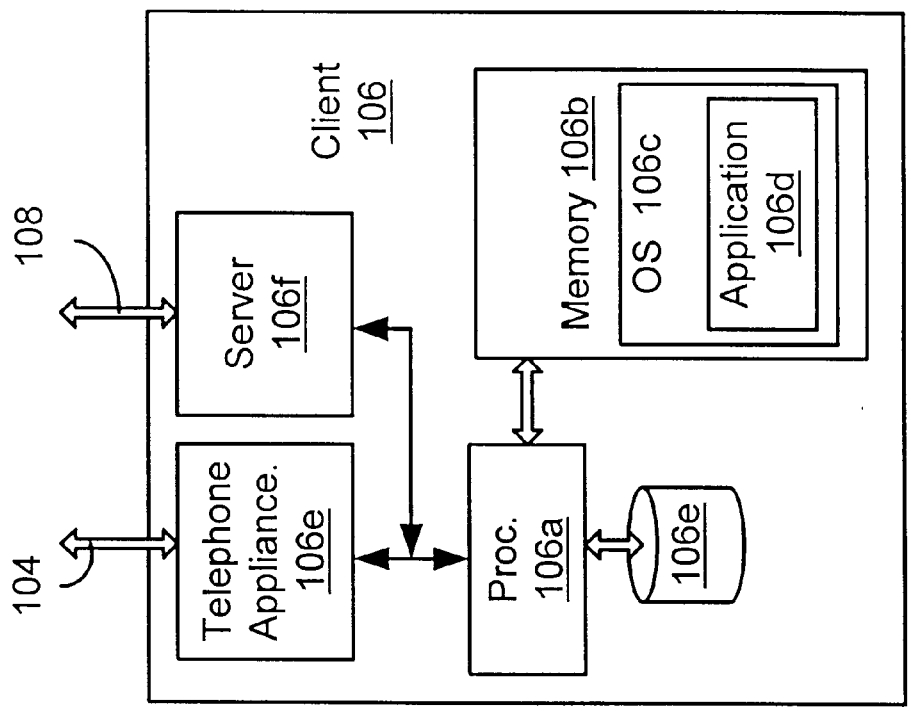
FIG. 3 is a block diagram of an exemplary thin client of the type depicted in FIG. 1.

A block diagram of an illustrative thin client 106 is depicted in FIG. 3. The thin client 106 includes a processor 106a, which is operative to execute a program stored in a memory 106b such as a ROM or RAM. Typically, the memory 106b includes an operating system 106c. The memory 106b further includes an application program 106d operative to perform the client methods described herein. Though the memory 106b within the thin client is illustrated as a single memory for simplicity, it should be appreciated that the memory 106b may include memory portions of different types. For example, the memory 106b may include a ROM, which maintains an executable code image, and a RAM for temporary data storage. Alternatively, the code image may be executed out of a RAM. The thin client 106 may optionally include secondary storage 106e.

The server 110 maintains a mapping table, such as depicted in FIG. 4, that is employed by the server 110 as described in further detail below. The table may include one or more entries although in a typical system it is contemplated that the mapping table will include and associate together entries corresponding to users authorized to use the network. Each entry within the table includes a user call destination identifier field 404, a user identifier field 402, and a client identifier field 406. As an administrative function, the server stores in the mapping table in the user identifier field the user identifiers associated with authorized users and a user call destination identifier (such as the users telephone number) in the corresponding user call destination identifier field. Exemplary mappings of user call destination identifiers and user identifiers are depicted in FIG. 4. Although in the illustrative embodiment, a table is used and described, as would be known to those of skill in the art other forms of associations and mappings such as , but not limited to, objects, arrays, and linked lists may be used.

In response to receipt at the server of a user identifier from a client and a client identifier from the client that forwarded the user identifier, the server stores the client identifier in the mapping table in the client identifier field for the table entry containing the received user identifier in the user identifier field. In the event certain users are not logged into the system, a default-value may be stored within the client identifier fields corresponding to such users.

In response to receipt at the server 110 of a digitized representation of a telephone call having a call destination identifier, the server 110 searches the mapping table for an entry having a user call destination identifier matching the call destination identifier contained within the received telephone signal. Server 110 selects the client identifier stored within the table entry having the matching call destination identifier. If the client identifier is not a default value, the server 110 establishes a connection between the telephone appliance 102 coupled to the respective client identified by the selected client identifier and the calling party to permit voice communication therebetween. As will be explained in greater detail below, if the client identifier field contains a default value, the server 110 directs the incoming telephone call to a default answering system. Such a default answering system may include the capability to forward the incoming telephone call to another telephone number or a voice mail system.

The telephone appliances 102 may be coupled to the respective thin clients 106 via a USB interface, a serial interface or a parallel interface. Other methods of coupling the telephone appliance 102 to the client 106 such as an infrared link, a wireless Rf link, or other electro-optical coupling may be used as well. One commercially available telephone appliance is available from Nortel Networks Corporation of Brampton, Ontario, Canada. This device employs a USB inteface for client coupling.

As shown in FIG. 1, communications between server 110 and the thin-clients 106 occurs over connections 108. In one embodiment, connection 108 may be a computer network such as a local area network (LAN). In a preferred embodiment, the local area network is an Ethernet network and the digitized representations of the telephone signal communicated between the server and the thin clients are communicated as voice over IP via the ethernet protocol. The server 110 may include a concentrator or switch which allows connection of the server 110 to a plurality of thin-client machines 106 through dedicated 100 mega-bit-per-second (Mbps) Ethernet links, such as a fast Ethernet switch. For example, a Gigabit/Fast Ethernet switch (not shown) may be employed by which thin-client machines 106 via are coupled to the switch employing 100 Mbps Fast Ethernet connections. In addition, a wide area network employing a frame relay or asynchronous transfer mode protocol may be used as well.

Moreover, the server 110 can comprise a single server or a plurality of servers interconnected by a high-speed local area network such as an Ethernet network, the internet, or any other suitable network. In the event multiple servers are employed, the functions attributable to the server 110 may be shared among the plural servers.

In a preferred embodiment, telephone switch 114 converts telephone calls received from telephone network 118 into digitized signals that comprise a series of data packets compatible with an Ethernet LAN. Each data packet preferably includes in the header portion a call destination indicator, such as the TCP/IP address of the thin client 106 associated with the particular user. Network protocols other than TCP/IP such as asynchronous transfer mode (ATM), and frame relay may be used that allow the identification of the thin client 106 that is associated with the particular user.

The telephone network 118 may comprise a private branch exchange (PBX) or a public switched telephone network (PSTN).

It is further noted that while the call destination identifier, in the above referenced example, is described as being a telephone number, the call destination identifier may comprise a switch identifier and an extension number or any other suitable identifier for addressing a telephone appliance.

The server 110 may also provide additional services to the user. For example, server 110 may direct incoming telephone calls for a user to a voice messaging system (not shown) if there is a busy signal, or if the user does not answer. Such a voice messaging system may include a digitized copy of the voice message being provided to the user via the network, which in one embodiment may be done as an attachment to an e-mail addressed to the particular user. Alternatively, the server 110 may receive a voice mail message and convert the speech to text and include the text as part of an e-mail message to the user. The e-mail message may be provided to the user via a cell-phone, or the text of the e-mail message may be provided to the user via a fax machine or a pager.

In another embodiment, the server 110 may redirect an incoming telephone call to other physical or virtual telephones. For example, if the user will be working remotely and away from a network connection, the server 110 may be programmed to direct incoming telephone calls destined for the user to one of a plurality of other telephone numbers corresponding to various physical telephones. The server 110 may be operative to interface with server-to-telephone interface 114 and a PBX or PSTN to forward the incoming phone call to the user's cell phone (not shown), home phone (not shown), or pager (not shown). In another embodiment, if the user is working remotely but has a network connection within a company wide-area-network, the server 110 may be programmed to direct incoming telephone calls destined for the user to a remote server (not shown) that is operating in the same local environment in which the user is working. The determination of which telephone number or remote server the incoming call should be directed to may be based upon the time or date or other information provided to the system. In one embodiment, server 110 may be programmed with a predetermined set of rules to direct incoming calls in different manners depending on the day, date, time, caller identity, or whether the user is logged into server 110.

Also, the server 110 may intercept and record any incoming signals that accompany the telephone signal, such as caller id, and provide this information to the user. Server 110 also may be programmed to provide caller dependent functions such as voice recognition. Server 110 may be programmed to recognize and respond to a particular user's verbal commands for dialing or other instructions.

In addition to receiving incoming phone calls, server 110 may be programmed to interface with the digital telephone switch 114 or a PBX to provide out-going call capability.

While the system described above discusses the direction of digitized representations of a telephone call from the server to a client, as a telephone call typically involves a two way communication, it should be appreciated that voice over IP communications also occurs in the reverse direction from the respective client to the server. In a preferred embodiment, such communications also employ the well known ethernet protocol.

Those skilled in the art should readily appreciate that computer programs operative to perform the functions herein described can be delivered to the server 110 in many forms including, but not limited to: (a) information permanently stored in a non-readable storage media (e.g. Read Only Memory Device) devices within a computer such as a ROM or CD-ROM disks readable by a computer I/O Attachment; (b) information alterably stored on a readable storage media (e.g. floppy disks, tapes, read-write optical media and hard drives); or (c) information conveyed to a computer through a communication media, for example, using baseband or broad band signaling techniques, such as over computer or telephone networks via a modem. In addition, those skilled in the art should appreciate that the presently described methods may be implemented in software executing out of a memory on a respective server. Alternatively, the presently described functions may be embodied in whole or in part using hardware components such as Application Specific Integrated Circuits (ASIC), state machines, programmed logic devices, controllers or other hardware components or other devices, or a combination of hardware components and software processes without departing from the inventive concepts herein described.

Those of ordinary skill in the art should further appreciate that variations to and modification of the above-described methods and systems for directing an incoming telephone call across a client-server network and connnecting the call to a telephone appliance coupled to a client employed by a user may be made without departing from the inventive concepts disclosed herein. Accordingly, the invention should be viewed as limited solely by the scope spirit of the appended claims.

What is claimed is:

1. A method for directing a received digitized representation of a telephone call having a call destination indicator, from a calling party, over a client-server network to a first user, the method comprising:

maintaining, at a server, an association among a first-user identifier corresponding to a first user and a first-user call destination-identifier;

generating, at a first client within said client-server network, a first-user identifier in response to a user-identification event;

transmitting, from said first client to said server, said generated first-user identifier and a generated first-client identifier associated with said first client, without said first user explicitly identifying said client to said server;

receiving at said server said generated first-user identifier and said generated first-client identifier;

dynamically associating at said server said generated first-client identifier with said first-user identifier for a period temporally concurrent with the use of said first client by said first user;

in response to receipt at said server of a digitized representation of a telephone call initiated by said calling party and including said first-user call-destination identifier, establishing a real-time bi-directional voice connection between said server and said first client having said first-client identifier, said real-time bi-directional voice communication including first and second digitized voice communications in opposite directions;

forwarding from said server at least a portion of said first digitized voice communication to a telephone appliance communicably coupled to said first client; and receiving at said server from said telephone appliance via said first client at least a portion of said second digitized voice communication.

2. The method of claim 1, further comprising:

maintaining an association among a second-user identifier corresponding to a second user and a second-user call-destination identifier;

associating a default value with said second-user identifier in the event the second user is not logged onto said client-server network; and in response to receipt at said server of said digitized representation of said telephone call initiated by said calling party, wherein said telephone call includes said second-user call-destination identifier, directing said digitized representation of said telephone call to a default answering system associated with said default value.

3. The method of claim 1, wherein establishing said real-time bi-directional voice connection includes establishing an ethernet connection between said server and said client.

4. The method of claim 3, wherein said real-time bi-directional voice connection comprises a voice-over-internet-protocol connection.

5. The method of claim 1, wherein said first client comprises a thin client.

6. The method of claim 1, wherein said server is operative to execute at least some application invoked by said first client and said first client comprises a thin client.

7. Apparatus for directing a received digitized representation of a telephone call having a call destination indicator, from a calling party, over a client-server network to a first user, the apparatus comprising:

a server operative to maintain an association among a first-user identifier corresponding to a first user and a first-user call-destination identifier;

a first client comprising one of a plurality of clients, said first client operative in response to a user-identification event to generate a first-user identifier and to transmit to said server said generated first-user identifier and a generated first-client identifier identifying said first client without said first user explicitly identifying said client to said server;

said server being operative to receive said generated first-user identifier and said generated first-client identifier and to dynamically associate said generated first-client identifier with said first-user identifier for a period temporally concurrent with the use of said first client by said first user;

said server being operative in response to receipt of a digitized representation of a telephone call initiated by said calling party and including said first-user call-destination identifier, to establish a real-time bi-directional voice connection between said server and a selected one of said plurality of clients identified by said generated first-client identifier, said real-time bi-directional voice connection including first and second digitized voice communications in opposite directions; to forward at least a portion of said first said digitized voice communication to a telephone appliance communicably coupled to said first client; and to receive from said telephone appliance via said first client at least a portion of said second digitized voice communication.

8. A method of forwarding a telephone call from a calling party to first user, the method comprising:

at a server, associating the first user with a first-user identifier and a first-user call-destination identifier, at a client in communication with the server, receiving logon data associated with a logon of the first user onto the client, based on receiving the logon data, transmitting to the server the first-user identifier and a client identifier, without the first user explicitly identifying the client to the server, at the server, based on receiving the first-user identifier and the client identifier, associating the first-user identifier with the client identifier, receiving a telephone call from the calling party and associated with the first-user call-destination identifier, and forwarding the telephone call to the client.

9. The method of claim 8, wherein the logon data includes one or more of: a username, a password, a smart card, and biometric data.

10. The method of claim 8, wherein receiving the telephone call from the calling party includes:

receiving a digitized representation of the telephone call.

11. The method of claim 8, wherein forwarding the telephone call to the client includes:

establishing a connection between the server and the client.

12. The method of claim 11, wherein establishing the connection between the server and the client includes:

establishing a bi-directional voice connection between the server and the client.

13. The method of claim 12, wherein the bi-directional voice connection includes a voice connection based on one or more of: an Ethernet protocol and a Voice-over-Internet protocol.

14. The method of claim 8, wherein forwarding the telephone call to the client includes:

forwarding the telephone call to a telephone appliance in communication with the client.

15. The method of claim 8, wherein forwarding the telephone call to the client includes:

determining whether a logout message has been received from the client, and based on the logout message not having been received, forwarding the call to the client.

16. The method of claim 15, further comprising:

based on the logout message having been received, forwarding the call to a default answer system.

17. The method of claim 8, wherein the client includes a thin client.

18. A system for forwarding a telephone call from a calling party to a first user, the system comprising:

a server configured to associate a first user with a first-user identifier and a first-user call destination identifier, and a client in communication with the server and configured to:

receive logon data associated with a logon of the first user onto the client, and based on receiving the logon data, transmit to the server the first-user identifier and a client identifier, without the first user explicitly identifying the client to the server, the server being further configured to:

based on receiving the first user identifier and the client identifier, associate the first-user identifier with the client identifier, receive a telephone call from the calling party and associated with the first-user call-destination identifier, and forward the telephone call to the client.

19. The system of claim 18, wherein the logon data includes one or more of: a username, a password, a smart card, and biometric data.

20. The system of claim 18, wherein the server is configured to receive a digitized representation of the telephone call.

21. The system of claim 18, wherein the server is configured to establish a connection between the server and the client.

22. The system of claim 21, wherein the connection includes a bi-directional voice connection between the server and the client.

23. The system of claim 22, wherein the bi-directional voice connection includes a voice connection based on one or more of: an Ethernet protocol and a Voice-over-Internet protocol.

24. The system of claim 18, wherein the server is configured to forward the telephone call to a telephone appliance in communication with the client.

25. The system of claim 18, wherein the server is configured to:

determine whether a logout message has been received from the client, and based on the logout message not having been received, forward the call to the client.

26. The system of claim 18, wherein the server is configured to:

determine whether a logout message has been received from the client, and based on the logout message having been received, forward the call to a default answering system.

27. The system of claim 18, wherein the client includes a thin client.

* * * * *